United States Patent [19]
Henry et al.

[11] Patent Number: 5,494,729
[45] Date of Patent: Feb. 27, 1996

[54] NON-SLIP, NON-ABRASIVE COATED SURFACE

[75] Inventors: Jeffery W. Henry, New Braunfels; Blair C. McCaw, Cilulo, both of Tex.

[73] Assignee: Impact Coatings, Inc., New Braunfels, Tex.

[21] Appl. No.: 50,334

[22] PCT Filed: May 20, 1993

[86] PCT No.: PCT/US92/04258

§ 371 Date: May 4, 1993

§ 102(e) Date: May 4, 1993

[51] Int. Cl.$^6$ .............................. B32B 27/40; C08L 81/04
[52] U.S. Cl. ........................ 428/147; 428/240; 428/283; 428/284; 525/122; 525/115; 525/189; 525/331.8; 525/403; 427/202
[58] Field of Search ................................. 525/122, 189, 525/115, 331.8, 403; 428/147, 240, 283, 284

[56] References Cited

U.S. PATENT DOCUMENTS

| | | | |
|---|---|---|---|
| 3,152,002 | 10/1964 | Wisotzky et al. | |
| 3,676,208 | 7/1972 | Griffin | 117/161 ZB |
| 3,717,897 | 2/1973 | Amos et al. | 15/215 |
| 3,801,347 | 4/1974 | Keller | 117/17 |
| 3,816,234 | 6/1974 | Winfield | 161/160 |
| 3,892,899 | 7/1975 | Klein | 428/49 |
| 3,945,972 | 3/1976 | Sakamoto | 260/47 EP |
| 4,108,813 | 8/1978 | Roberts | 260/29.6 S |
| 4,141,187 | 2/1979 | Graves | 52/173 R |
| 4,189,548 | 2/1980 | Sakashita et al. | 525/109 |
| 4,348,233 | 9/1982 | Simic | 106/18.23 |
| 4,477,610 | 10/1984 | Ishimura et al. | 523/414 |
| 4,501,783 | 2/1985 | Hiragami et al. | |
| 4,607,078 | 8/1986 | Dergazarian | |
| 4,882,205 | 11/1989 | Valenduc | |
| 5,110,657 | 5/1992 | Ainslie | |

FOREIGN PATENT DOCUMENTS

| | | |
|---|---|---|
| 37927/85 | 1/1984 | Australia . |
| 2204074A | 4/1988 | United Kingdom . |

OTHER PUBLICATIONS

Brochure, MC$^{TM}$–2027 Masonry Coating.
"Thiokol®Coatings and Sealants," Morton International, Inc.
"Polysulfide resins," McGraw–Hill Encyclopedia of Chemistry.
"Polysulfides," Encyclopedia of Clinical Technology, vol. 18, Kirk–Othomer, McGraw–Hill.
Dialog Search.
PCT Search Report dated Dec. 21, 1992.

*Primary Examiner*—P. C. Sluby
*Attorney, Agent, or Firm*—Conley, Rose & Tayon

[57] ABSTRACT

A substantially non-slip, non-abrasive surface which includes a layer of a coating vehicle comprising a polysulfide mixed with a plurality of solid elastomer particles. The particles are preferably at least partially embedded in the coating composition to provide a surface which maintains tractional sufficiency in wet and dry environments such as swimming pools and related areas.

28 Claims, 2 Drawing Sheets

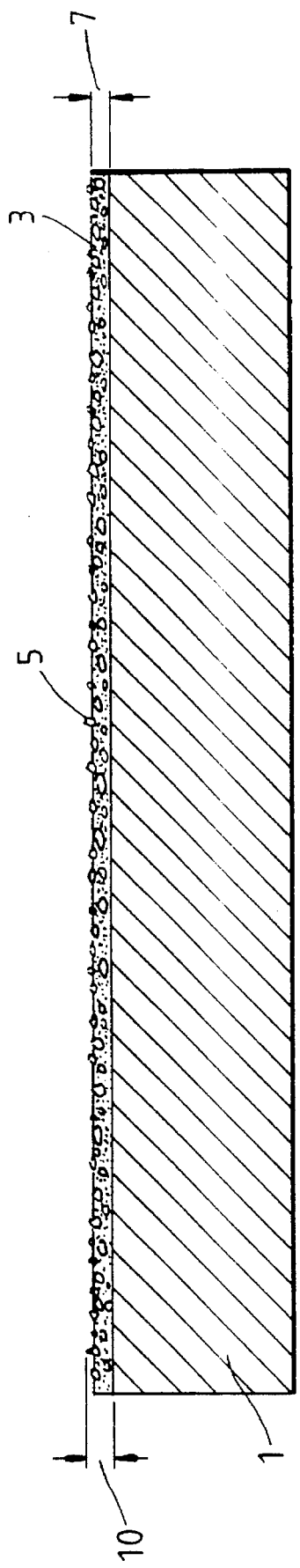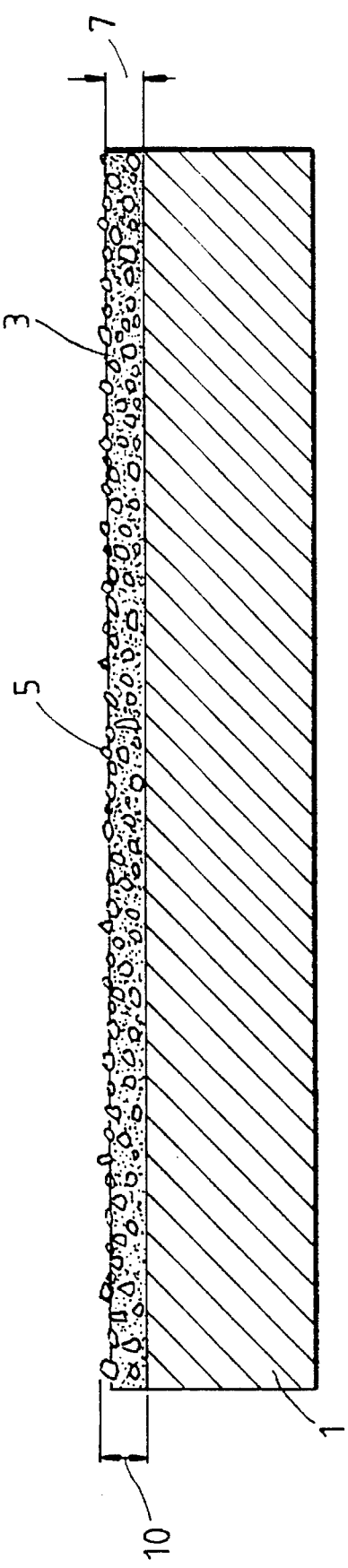

NON-SLIP, NON-ABRASIVE COATED SURFACE

This invention relates to substantially non-skid, non-abrasive surfaces, and to methods of preparing such surfaces. More particularly, the invention relates to a coating which includes a polysulfide based binder or vehicle in which a plurality of solid elastomer particles are embedded. This coating is applied to a substrate to make a substantially non-skid, non-abrasive surface. The invention is particularly useful in wet environments.

Existing non-skid, non-abrasive surfaces have met with limited success. Existing surfaces that are non-skid tend to also be abrasive to human skin. Existing surfaces that are non-abrasive to human skin tend to wear quickly and be weak and unstable.

The problems with non-skid, non-abrasive surfaces are magnified in wet environments, especially swimming pools and swimming pool areas. Wet environment surfaces must have improved traction since water tends to lubricate these surfaces and make them more slick. Surfaces for swimming pool areas must be less abrasive since they are generally contacted by bare skin instead of shod feet. In addition, wet environment surfaces must be more wear resistant than dry surfaces since the presence of water tends to cause increased surface degradation.

Persons skilled in the art have searched for surfaces that would be non-skid, non-abrasive and wear resistant, especially in wet environments. For example, non-skid, non-abrasive surfaces for swimming pools have included such surfaces as roughened concrete, cloth impregnated surfaces, artificial turf such as Astroturf, and laminated sand. All of these surfaces, however, have inherent problems associated with them. Roughened concrete surfaces are generally too abrasive when contacted by bare skin. Cloth impregnated surfaces and astroturf are slippery when wet and tend to wear relatively quickly. Cloth impregnated surfaces also tend to provide a good bacteria environment (especially when wet), thus causing increased odor and health concerns. Laminated sand is too abrasive for many applications and tends to wear unevenly, causing dangerously slick smooth spots. Laminated sand has been found to cause painful "strawberry" injuries to human skin, especially when the skin has been softened by prolonged water immersion in swimming pools. In addition, laminated sand is difficult to apply evenly, since it is difficult to see which areas have been adequately covered.

In addition to the above, persons skilled in the art have attempted to adhere rubber or foam particles to substrates by spreading the particles on the surface and then laminating the surface. Surfaces prepared in this manner have tended to wear quickly, especially in wet environments, because the particles tend to break loose from the surface.

Thus persons skilled in the art have searched for a surface that would be (1) non-skid, (2) non-abrasive to human skin, (3) easy to apply, (4) highly resistant to wear, especially in wet environments, and (5) stable in dry and wet environments.

Polysulfide polymers are well-known and are available in many formulations for a variety of uses. Polysulfides are marketed as solids and also as liquids. The liquids are typically thiol-terminated polymers which may be cured or converted to solid form by oxidizing the terminal thiols. Inorganic oxides such as lead dioxide and zinc peroxide may be used for this purpose. Curing may also be obtained in conjunction with epoxy resins by tertiary amine catalysis, and by reaction with an oxirane. When cured with epoxy resins, the resulting product may be considered to be a copolymer, an epoxidized polysulfide, or the like. When cured with an oxirane, the resulting product may be considered to be an adduct.

Solid polysulfide polymers are very resistant to solvents and find wide application as sealants. They have also been applied as epoxy flexibilizers, concrete coatings, and gaskets. They are known, however, to have relatively poor tensile strength and abrasion resistance. See Hawley's Condensed Chemical Dictionary at page 943, 11th Edition (Van Nostrand Reinhold, New York, U.S.A.). Thus, polysulfides have not been generally considered for non-skid surface coating compositions, since the tractional contact on such surfaces has been thought to be too vigorous for this material. In addition, it has been known to incorporate mineral fillers such as calcium carbonate powder and carbon black in polysulfides, but not granules or other relatively large particles.

The present invention in a general aspect provides a polysulfide-based coating that has good non-skid, nonabrasive, wear-resistant, and stable characteristics in both dry and wet environments. The invention more particularly resides in a polysulfide film or layer containing a plurality of solid, elastomeric particles which penetrate the surface of the film or layer. The method of the invention comprises mixing such particles with a liquid polysulfide and curing the resulting mixture in the form of a coating on concrete or other surfaces. The invention has particular application to surfaces around swimming pools, open walkways, showers and locker room floors, etc., which are often wet with water.

The coatings of the invention may be applied in different ways. In one way a liquid polysulfide is mixed with particles of a solid elastomer and a curing agent, and then distributed over a substrate to be coated. In another preferred way, a liquid polysulfide in mixture with a curing agent is layered on a substrate, and particles of elastomer are then distributed over the layer. The particles preferably at least partially penetrate the surface of the coating. It is preferred that the particles are sufficiently dense at the surface to completely cover the underlying vehicle.

As stated above, the coatings of the invention preferably comprises a polysulfide-based vehicle and particles of an elastomer which protrude from the surface of the vehicle. The vehicle binds to both the particles and the substrate to which the coating is applied. It is therefore important that the vehicle be capable of firmly adhering to the particles as well as the substrate.

In the context of the invention, the term "firmly adhering" may be defined as meaning that the coating is not easily removed by ordinary traction contact, as for example, by human feet. In that regard studies have revealed that the vehicle, when cured, should be strong enough to provide firm adhering qualities but not so firm as to be brittle. It is understood, however, that the vehicle "firmly adheres" to the particles even though some particles may break loose from the vehicle over time during use.

The vehicle should also possess a viscosity low enough to be readily applied as a coating, but also high enough to resist agglomeration of the elastomer particles, especially in low areas.

It will be apparent that the above characteristics are stated in somewhat general terms and may vary from one substrate and coating to another.

Polysulfides useful in the invention are readily available from a number of commercial sources. One prominent source is Morton International, Inc., Specialty Chemicals Group, Chicago, Illinois, U.S.A. The products of this supplier are proprietary but are polysulfides which contain terminal mercaptan groups.

A typical class or group of polysulfides useful in the invention are polymers of bis-(ethylene oxy) methane containing disulfide linkages and thiol or mercaptan (—SH) reactive terminal groups. The general structure of this class is:

$$HS(C_2H_4-O-CH_2-O-C_2H_4SS)_xC_2H_4-O-CH_2-O-C_2H_4SH$$

Epoxy resins in conjunction with aliphatic or aromatic amines may be cured with these and other polysulfides for use in the invention.

The particles of the invention are solid elastomers which preferably range in diameter between about 0.3 and about 3.0 mm and have a specific gravity between about 1.3 and 1.8 at 20° C. Particles within this density range are heavy enough to sink within the vehicle but not so heavy as to cause agglomeration, especially on sloped surfaces. The particles may be formulated from any suitable elastomer, including natural and synthetic rubbers.

FIG. 1 depicts a surface of the invention wherein a coating vehicle is applied to a substrate, and then elastomer particles are applied to the vehicle.

FIG. 2 depicts a surface of the invention wherein elastomer particles are mixed with a coating vehicle, and the resulting coating is then applied to a substrate.

Figure 3:
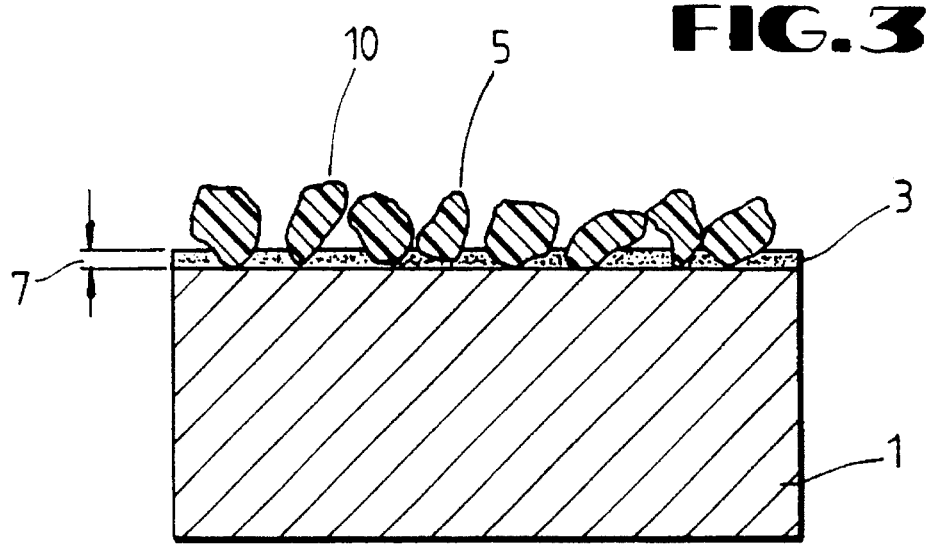
FIG. 3 depicts a surface wherein a coating vehicle is too thin and the particles are inadequately adhered to the vehicle.

As shown in FIG. 1, in a preferred embodiment the surface includes a coating 10 of the invention formed on a substrate 1. In this embodiment, the coating 10 includes a coating vehicle or binder 3 that is first applied in a layer 7 to the substrate 1. The coating 10 also includes a plurality of solid elastomer particles 5 that are applied as described herein. In a preferred embodiment the thickness 7 of the coating vehicle 3 may vary from about 5 to 50 mils (0.127 to 1.270 millimeters ("mm")). A mil is equal to 1/1,000 of an inch.

In an alternate embodiment, as shown in FIG. 2, the coating 10 of the invention may be made of a coating vehicle or binder 3 mixed with the particles 5 prior to application to the substrate 1. In this preferred embodiment, the thickness 7 of the coating vehicle may be larger than 50 mils.

Features of the invention are described in detail below.

THE COATING VEHICLE

As stated earlier, the polysulfides of the invention may be readily obtained from a number of commercial suppliers. The polysulfides may also be polymerized with other monomers or polymers to form polymers or adducts. One preferred such adduct is formed by reacting a polysulfide with an oxirane group having the following general structure:

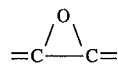

to form an adduct. Preferably about 20–95% of the coating vehicle comprises the adduct. The adduct may be cured by cross-linking with an amine.

Another preferred vehicle embodiment comprises flexibilized polysulfide/epoxy coatings ("FEC") such as provided in the FEC-2000 group made by Morton International, Inc., Specialty Chemicals Group (Chicago, Ill. U.S.A.). An especially preferred embodiment comprises Morton International compound FEC-2233, which is understood to be an epoxy terminated polysulfide polymer. Another preferred embodiment based on information available from Morton International is understood to include a first composition comprising about 60–90% of an epoxy terminated polysulfide polymer (such as FEC-2233), about 10–30% bisphenol A, about 5–10% titanium dioxide, about 5–10% quartz, and about 1–5% butylglycidyl ether. This product is cured with a second composition comprising about 30–60% isophorone diamine, about 10–30% benzyl alcohol, about 10–20% phenol, about 5–10% m-xylenediamine, and about 1–5% amorphous silica. This information is provided by Morton International. In a preferred embodiment the first composition is mixed with the second composition to form the coating vehicle; the particles are then applied to this vehicle.

It is understood that FEC 2233 includes Morton International liquid polysulfide polymers LP-3 or LP-33. It is contemplated that other liquid polysulfide polymers such as Morton International LP-31, LP-2, LP-32, and LP-12 are also operable as polysulfide compounds in the coating vehicle of the invention. All of the above Morton International compounds are polysulfide compounds with reactive mercaptan groups.

It is understood that preferably the coating vehicles of the invention have a tensile strength after seven days of cure, at about 70°–75° F., of at least about 500 psi as measured pursuant to ASTM D638. If the tensile strength is too low, the vehicle may not adequately adhere to the particles to be resistant to tractional contact (e.g., by contact to human feet). It is understood that the coating vehicles should also have a tensile strength of between about 500 and about 7500 psi, and preferably still about 1000–5000. Coating vehicles with tensile strengths that are too high tend to be so brittle when cured that the particles are relatively easily removed from them during use.

It is understood that the coating vehicles after seven days of cure should also have a break elongation, at about 70°–75° F. pursuant to ASTM D638, of at least about 15%. Preferably, the break elongation should be in the range from about 15 to about 80%. A cured coating vehicle with a break elongation that is too low tends to be too brittle and particles are thus relatively easily removed when contacted by human feet. A cured coating vehicle with a break elongation that is too high tends to be too soft to adequately hold the particles in place during use.

It is understood that preferably the coating vehicles should further have a C-tear of about 50–340 psi at 70°–75° F. after seven days of cure. The C-tear is a test conducted by Morton International that is a measure of the internal strength of a composition.

It is understood that the coating vehicles after seven days of cure should have a modulus, at about 70°–75° F. pursuant to ASTM D638, and at about 10% elongation, of at least about 200. Preferably, the coating vehicle has a modulus in the range of about 200–2000 when cured.

It is understood that the adhesion of the coating vehicle is preferably characterized by a lap shear pursuant to ASTM D1002 at 40° C. of at least about 1000. More preferably, the lap shear is in the range between about 1000 and about 5000. If the lap shear is too small, the cured coating vehicle will tend not to adequately adhere to the particles or to the substrate. If the lap shear is too large, the coating vehicle becomes difficult to apply.

In a preferred embodiment, the viscosity of the coating vehicle before cure is between about 500 centipoise and about 1500 poise at about 75° F. (about 23.9° C.). If the viscosity is too high, then the coating composition is difficult to apply.

The coating vehicle should not be too thick or too thin. If the vehicle is too thin, it may be difficult to ensure that the substrate is coated with enough vehicle to provide a sufficiently tacky surface for the particles. Preferably the vehicle layer is deep enough so that particles can at least be partially embedded into it. As shown in FIG. 3, if the vehicle layer 3 is too thin, the amount of surface area of the particles 5 that contacts the vehicle 3 is relatively small; thus, the particles 5 in this surface 10 are relatively easily removed from the vehicle since they are not firmly adhered to the coating vehicle 3.

Figure 4:
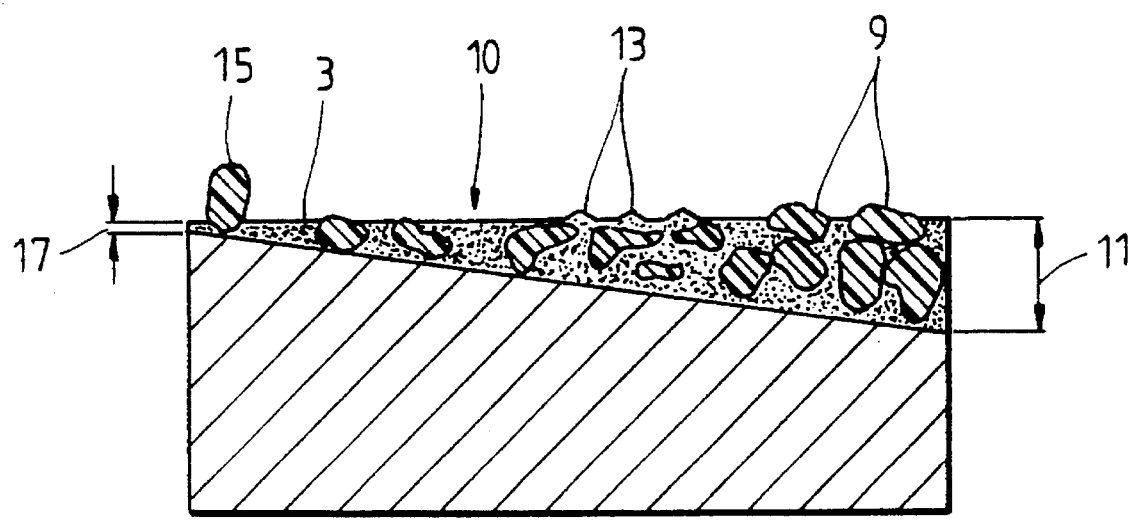
FIG. 4 depicts a surface that has been improperly formed on a sloped substrate.

If the coating vehicle is too thick, it may tend to agglomerate during application to uneven substrates. If the substrate to be coated is not perfectly level (and few substrates are), then a coating vehicle that is too thickly applied may agglomerate during application in the "low" areas and be too thin in the "high" areas. As shown in FIG. 4, particles tend to flow with gravity toward the low sections and tend to pull the coating vehicle with them. Thus, the particles 9 flow to the low sections of a sloped surface, and the thickness 11 in the sloped low portions tends to be too thick. Furthermore, wrinkling 13 of the coating tends to be caused by the flow of vehicle and particles from the high sections to the low sections. When a coating flows to the low sections, high sections of the substrate tend to become too thinly coated. Thus, particles 15 in the high sections tend to be inadequately adhered to the high sections, since the vehicle thickness 17 in the high sections tends to be inadequate to promote such adherence. In addition, agglomeration leaves the high sections inadequately coated with particles since the particles tend to migrate to the low sections when agglomeration occurs.

Coating vehicles that are too thick have been found to be particularly susceptible to wrinkling during application even on relatively flat substrates due to the self-leveling nature of the coating vehicle. Wrinkling of the coating vehicle during application causes the surface to be unsightly and excessively abrasive. In addition, coating vehicles that are too thickly applied have been found to bubble during cure. This bubbling is believed to be due to the release of gases caused by overheating during the exothermic cure. In one application bubbling resulted when the coating vehicle was greater than about 40 mils at 75° F. (about 23.9° C.) ambient temperatures. It is believed that thinner coating vehicle layers have a higher surface area to volume ratio, thus allowing the generated heat of reaction to be dispersed more easily, and thus maintaining the vehicle layer at a temperature low enough to prevent bubble formation. This bubbling causes the cured surface to be unsightly and abrasive. Moreover, a thicker coating is more expensive to apply, since more coating materials are used.

Based on the above, it has been found generally preferable for about 5 to about 50 mils (0.127 to 1.270 mm) of a coating vehicle be applied to a substrate, especially when the particles are about 0.3 to 3.0 mils average diameter. Further preferred, the coating vehicle is between about 15 and 40 mils (0.381 to 1.016 mm) thick, and more preferably still the vehicle is between about 20–30 mils (0.508 to 0.762 mm) thick. Twenty mil thick vehicle layers have been successfully applied to prepare coatings of the invention.

THE PARTICLES

The non-skid characteristics of the surfaces of the invention are provided by preparing a surface wherein a coating vehicle is applied to a substrate, and further wherein a plurality of elastomer particle granules (hereinafter "particles") are partially embedded in the vehicle and partially project from the top surface of the vehicle. Thus in a preferred embodiment, the particles project from a plane parallel to the surface of the coating vehicle to create a non-skid surface.

As stated above, the particles are made of solid elastomers such as rubber. Preferably, the particles comprise an ethylene-propylene diene modified polymer ("EPDM"). Preferred particles of the invention include EPDM particles provided by Midwest Elastomers, Inc. (Wapakoneta, Ohio, U.S.A.). A wide variety of colors are available, however, preferably light colored particles (such as white and light blue) are used for swimming pool applications. The particles are preferably made by cryogenic shredding of solid elastomers. The particles are typically irregular shaped solid "chunks" of material that are sieved in various size ranges.

It is preferable that the particles are between about 0.3 and 3.0 mm average diameter. Since the particles are typically irregularly shaped, the term "average diameter" is used to describe particles that will pass through various sieve sizes. In other words, the phrase "particles that are between about 0.3 and 3.0 mm average diameter" means particles that will pass through a vibrating sieve made up of 3.0 mm squares, but will not pass through a vibrating sieve made up of 0.3 mm squares. If the particles are less than about 0.3 mm, they tend to completely sink in the coating vehicle during application, especially if the coating vehicle layer is greater than about 15 mils thick. As discussed above, in a preferred embodiment the vehicle is at least about 15 mils thick. If the particles sink, they do not project from the top surface of the vehicle and the resulting surface provides less traction during use. For instance, if the coating vehicle thickness is about 15 to 40 mils (about 0.381 to 1.016 mm), some of the particles less than about 0.3 mm tend to completely sink in the vehicle, adding little or no traction to the resulting surface. In addition, if the particles are less than about 0.3 mm average diameter, they approach the size of dust, and are difficult to apply evenly. These dust-like particles are also relatively easily dispersed by wind during application.

If the particles are larger than about 3.0 mm average diameter, the average spacing between particles is relatively large. Large spacing between particles tends to cause the surface to be more abrasive to human skin, since the harder, cured coating vehicle is then available to contact human skin. Furthermore, if the particles are larger than about 3.0 average diameter, they tend to inadequately adhere to the preferred layer thicknesses (e.g., about 5–50 mils, more preferably about 15–40 mils, and more preferably still about 20–30 mils) of coating vehicle. See FIG. 3 and related discussion above.

Based on the above, the particles are preferably not too big and not too small. In a preferred embodiment, the particles are between about 0.4 and 2.5 mm average diameter. More preferably, the particles are between 0.5 to 1.5 mm average diameter. These particle size ranges are easily achieved by sieving particle chunks.

In a preferred embodiment, the particles have a specific gravity of between about 1.3 and about 1.8 at 20 degrees Celsius. The specific gravity of the particles is important since it is desirable that the particles sink relatively rapidly in the coating composition during application. Thus, it is important that the particles have a specific gravity of at least about 1.3. On the other hand, if the particles are too heavy, they tend to cause agglomeration of the coating composition on sloped surfaces. This agglomeration results because heavier particles tend to more easily slide downwards on slope surfaces during application. In doing so, they pull substantial amounts of coating vehicle with them, and thus cause uneven layering of the coating composition on sloped surfaces. Since the surfaces of the invention are often used in sloped surfaces (e.g. swimming pools), such agglomeration is undesirable.

The particles should preferably have a tensile strength pursuant to ASTM D412 of at least about 500 psi. If the tensile strength is too low, the particles tend to break too easily when contacted during use.

Preferably, about 0.10 to about 0.60 pound of particles are used per square foot of surface. More preferably, about 0.20 to about 0.30 pounds of particles are used per square foot of surface. If too few particles are used, then the surface tends to be inadequately covered with particles. If too many particles are used, then excessive cleanup is necessary to remove unattached particles.

The nonabrasive characteristics of the coating are provided at least in part by the hardness of the materials used in the coating. It is advantageous that neither the coating vehicle nor the particles be too hard or too soft. If either is too hard, then the surface becomes excessively abrasive to human skin. If either is too soft, then the particles tend to break easily, or to break loose from the vehicle easily. In general, the cured coating vehicle is harder and stronger than the particles to firmly hold the particles in place, and to firmly adhere to the substrate. Although the vehicle is harder and more abrasive than the particles, the resulting coating remains non-abrasive, since the particles comprise the primary part of the coating that contacts human skin during use. Preferably the coating is substantially non-abrasive to human skin (i.e., the coating will not cause "strawberry" abrasions when bare skin is rubbed against it during use in, for instance, a swimming pool). Preferably the coating is less abrasive to human skin than laminated sand.

In a preferred embodiment the coating vehicle when cured is between about 40 and 80 Shore D hardness and the particles are between about 45 and 95 Shore A hardness. More preferably, the coating vehicle is between about 50 and 75 Shore D, and the particle hardness is between about 60–80 Shore A.

A feature of the invention lies in the fact that the coating is substantially impermeable to water. Thus, the coating can be used to cover and fill cracks in substrate materials such as concrete. Further, the coating of the invention can also be used to reduce deterioration of substrates. This feature is especially advantageous for applications in swimming pools. Thus a major advantage of the coating is that it provides a non-skid, nonabrasive, water impermeable, and sealant coating—all in one application.

Another feature of the invention is that the coating does not exhibit any substantial degradation when immersed in water at 70° F. for thirty days. This feature is a substantial improvement over other non-skid, non-abrasive surfaces known in the art which tend to degrade when immersed in water. More particularly, an advantage of the invention is that the coating does not exhibit any substantial degradation when immersed in chlorinated water. For example, the coating of the invention does not exhibit any substantial degradation when immersed in about 0 to 5 percent (preferably 0 to 100 ppm) chlorinated water for 30 days.

Another advantage of the coating of the invention lies in their improved wear characteristics. In one experiment, a 4'×4' surface of the invention was placed in the entrance way to a Schlitterbahn water amusement park for one season in New Braunfels, Tex., U.S.A. This park had a total of about 620,000 patrons in one season. Since this entrance was also the exit, then at least about one million humans walked over this surface. Furthermore, this surface was frequently contacted by wet feet. After the season, the surface was measured for wear. It was found that less than about 20% of the surface had been worn away.

Another advantage of the invention resides in the surface being curable to form a solid within a time period of less than 24 hours at a temperature of about 75° F. At this point the surface is about 60 percent cured. The surface becomes completely cured after 7 days at about 70° F. As the temperature increases the cure time decreases, and vice versa. The relatively quick cure time is advantageous, since it is possible to apply the surface in a short time period.

METHOD OF APPLICATION

In a preferred embodiment a substantially non-slip, non-abrasive surface may be applied to a substrate in the following manner. First, a layer of liquid vehicle (binder) which comprises a polysulfide is applied to the substrate. Second, a plurality of solid elastomer particles is applied to the vehicle such that the particles are at least partially embedded into the vehicle. Third, the vehicle is allowed to cure to a solid such that the particles are embedded into it.

Preferably, a substrate to be coated is first cleaned of oil, grease, dirt, leaves, old paint, etc. before applying the non-slip, non-abrasive surface of the invention. In an alternate embodiment, the substrate may be first etched or treated with acid prior to application of the coating of the invention.

One advantage of the coating of the invention is that it may be applied to a variety of substrates. A preferred substrate is concrete, and more preferably the concrete has cured for at least about 28 days prior to applying the coating of the invention.

During application of a coating of the invention, preferably notched squeegees are used to help insure that a substantially even layer of liquid vehicle is applied to the substrate. One preferred rubber squeegee has a series of ⅛ inch equilateral triangle notches on the squeegee surface. In an alternate method, the coating vehicle may be sprayed on the substrate. Brushes and rollers may be used to help even the vehicle on the substrate.

If the substrate surface is to include a wall as well as floor surfaces, it is preferable that the walls are coated prior to doing the floor. In this manner, the resulting non-slip, non-abrasive coating tends to have less overlap at the interface between the wall and the floor.

The particles may be applied to the vehicle by hand or by mechanical distributors such as sand blasters. Preferably about 0.10 to about 0.60 pound of particles is applied per square foot of surface desired. It is also preferable that an excess amount of particles be applied to the vehicle. In other words, it is preferable that the number of particles applied to the coating vehicle be such that some of the particles do not contact enough of the vehicle to adhere to the vehicle. The excess particles may be removed from the resulting surface after the vehicle has cured. This removal may be easily accomplished by sweeping or vacuuming the final surface after cure.

Preferably about one to about 2 ½ times the amount of particles to be embedded in the vehicle are applied to the vehicle. In this manner substantially all of the top surface of the vehicle is covered with particles. The resulting surface is then substantially full of particles with no bare spots.

In a preferred embodiment, the particles are applied to the coating vehicle by a person wearing spiked shoes or spiked walkers. In this manner footprints are not left on the vehicle surface and the resulting non-slip, non-abrasive surface is maintained substantially level.

An advantage of the surfaces of the invention is that the particles adequately adhere to the vehicle without use of additional top coatings. Many non-skid surfaces that use particles also apply a top coating (such as epoxy based paint) on top of the particles to help hold them to the substrate. This top coating unfortunately tends to be abrasive, since it must be relatively strong and adhesive (and thus harder) to adhere the particles in place. If the coating is soft enough to be non-abrasive, then it tends to inadequately adhere to the particles—thus the particles are relatively easily removed during use. The surfaces of the invention, however, preferably do not employ a topcoat to adhere particles to a substrate. Instead, the particles are applied to cover a coating vehicle. Thus, the surface of the invention is designed to provide softer particles on top of a coating (where human contact occurs), while the stronger but more abrasive vehicle is beneath the particles (where human contact is greatly reduced).

Since the particles of the coating of the invention are preferably not coated, it is easier and less expensive to prepare the surface of the invention. Furthermore, the surface of the invention is less abrasive to human skin since the relatively soft particles contact the skin—not harder top coatings, and not a harder vehicle coating.

As discussed above, in a preferred embodiment the vehicle or binder is normally provided in two separate compounds or components (e.g. compounds A and B). One of the compounds preferably includes a polysulfide. The two compounds or components are preferably mixed and then applied in a long straight line to the substrate to be covered by the coating. Squeegees are then applied to the mixture to evenly disperse it over the substrate. Rollers may also be applied to the mixture to further distribute the mixture over the substrate. Preferably, the mixture is applied using rollers with a medium nap that will not pull loose when used.

In a preferred embodiment, about 0.5 pound of particles is applied per square foot of surface to be covered. In a preferred embodiment enough particles are used to completely cover the coating vehicle such that the coating vehicle is not visible. In a preferred embodiment, about 0.25 pound of particles remain per square foot of coating vehicle and about 0.25 pound of particles per foot of coating vehicle are swept from the resulting surface after the vehicle has cured.

The coating of the invention finds particular application to swimming pools and swimming pool areas, as well as other areas where non-skid, non-abrasive surfaces are desired. Examples of other applications include bathrooms, showers, locker rooms, amusement parks (especially water amusement parks), store entry walkways, sidewalks, porches, decks, and any other surfaces, especially surfaces that may become slick when wet.

For application of the coating of the invention to walls, in a preferred embodiment the coating vehicle is applied with squeegees and rollers. Since the coating vehicle is viscous and cures to a solid relatively rapidly (preferably in a time period of less than about 24 hours at 75° F.), it is possible to prepare the wall with the coating thickness desired. After the vehicle has been applied in the thickness desired, particles may be applied by hand by cupping a handful of particles in the hand and then simply moving the cupped hand up the wall to apply the particles. Alternately, particles may be thrown against the wall to adhere the particles.

In one embodiment, the particles may be mixed with the vehicle prior to application to the substrate. Once this mixture has been applied to the substrate, then optionally additional particles may then be applied on top of it. It is preferable that enough particles are mixed with the vehicle such that the vehicle only forms a thin binding film between particles. The mixture may then be troughed into place. This mixture may be applied in layers thicker than 50 mils since the vehicle is so thinly filmed on the particles that surface forces tend to prevent it from flowing. The thinly applied vehicle also does not tend to bubble because the heat of reaction (which is less anyway since less vehicle is applied) may be adequately absorbed/dissipated to the surroundings and surrounding particles. In some applications the vehicle is so thin that pores and voids form in the surface. These pores may be preferred in some applications to allow water permeation (e.g. if the surface was applied around a tree).

One advantage of the surface of the invention is that it provides tractional sufficiency during wear. "Tractional sufficiency" is defined to mean that the surface has sufficient traction to allow a human to safely walk on the surface. For instance, wet linoleum typically lacks tractional sufficiency but dry linoleum does not. The surface of the present invention maintains tractional sufficiency during and after wear since the particles, which provide a large part of the traction, tend to remain at least partially embedded into the coating composition after wear. Thus, tractional sufficiency is maintained until the surface of the invention is almost completely worn down to the substrate. The surface of the invention also maintains tractional sufficiency when wet.

A further advantage of the surface of the invention is that the surface (especially when made light in color) absorbs only very limited amounts of radiant sunlight energy. Thus in the summer the surface of the invention does not get excessively hot in sunlight, which is an advantage for applications where the surface will contact bare skin (e.g., swimming pool areas). In one experiment, a surface was tested for heat rise in sunlight. This surface included a 20–30 mil layer of vehicle completely covered with a 50/50 percent mixture of "baby" blue and "eggshell" white Midwest Elastomers, Inc. 0.5–1.5 mm average diameter particles. This surface temperature rose to a maximum of about 10° F. above ambient temperature when contacted by bright sunlight when ambient temperatures were as high as 90° F. over a period of one day.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements and compositions described herein or in the steps or in the sequence of steps of the methods described herein without departing from the spirit and scope of the invention as described in the following claims. Similarly, isomers and homolog of compounds described herein may be used and still come within the scope of the invention.

We claim:

1. A substantially non-slip coated substrate comprising:

a solid film comprising a polysulfide, the film being spread on the substrate to form an exposed film surface; and a layer of elastomer particles between 0.3 and 3.0 mm average diameter partially bound in the exposed surface of the film, at least some of the particles projecting from the top surface of the film and not being coated with film material, said particles being softer than the solid film, the hardness of the particles being between about 45 and 95 Shore A.

2. The coated substrate of claim 1 wherein the coated substrate non-abrasive to human skin.

3. The coated substrate of claim 2 wherein the coated substrate maintains tractional sufficiency during use.

4. The coated substrate of claim 1 wherein the coated substrate is less abrasive to human skin than a substrate coated with laminated sand.

5. The coated substrate of claim 4 wherein the coated substrate maintains tractional sufficiency during use.

6. The coated substrate of claim 1 wherein the film comprises a polysulfide reacted with an oxirane group.

7. The coated substrate of claim 1 wherein the film comprises a polysulfide reacted with an oxirane group to form an adduct, the adduct comprising 20–95% of the film.

8. The coated substrate of claim 1 wherein the film comprises a polysulfide reacted with an oxirane group, and cross-linked with an amine.

9. The coated substrate of claim 1 wherein the particles comprise rubber.

10. The coated substrate of claim 1 wherein the particles comprise an ethylene-propylene modified polymer.

11. The coated substrate of claim 1 wherein the particles are between 0.5 and 1.5 mm average diameter.

12. The coating of claim 1 wherein the hardness of the film is between about 40 and 80 Shore D.

13. The coated substrate of claim 1 wherein the hardness of the film is between about 50 and 75 Shore D, and the hardness of the particles is between about 45 and 95 Shore A.

14. The coated substrate of claim 1 wherein the hardness of the film is between about 40 and 80 Shore D, and the hardness of the particles is between about 60 and 80 Shore A.

15. The coated substrate of claim 1 wherein the particles have a specific gravity between about 1.3 and 1.8 at 20° C.

16. The coated substrate of claim 1 wherein the particles have a tensile strength pursuant to ASTM D412 of at least about 500 psi.

17. The coated substrate of claim 1 wherein the film after 7 days of cure has a tensile strength, at about 70°–75° F. pursuant to ASTM D638, of at least about 500 psi.

18. The coated substrate of claim 1 wherein the film after 7 days of cure has a break elongation, at about 70°–75° F. pursuant to ASTM D638, of at least about 15 percent.

19. The coated substrate of claim 1 wherein the film after 7 days of cure has a modulus, at between about 70° and 75° F. pursuant to ASTM D638, and at about 10 percent elongation, of at least about 200.

20. The coated substrate of claim 1 wherein the film does not exhibit any substantial degradation when immersed in water at 70° F. for 30 days.

21. The coated substrate of claim 1 wherein the film does not exhibit any degradation when immersed in chlorinated water at 70° F. for 30 days.

22. The coated substrate of claim 1 comprising between about 0.10 and 0.60 pound of particles per square foot of surface of film.

23. The coated substrate of claim 1 wherein the coating maintains tractional sufficiency during use while wet, and the coating maintains tractional sufficiency during use while dry.

24. The coated substrate of claim 1 wherein the film is between about 5 and 50 mils thick.

25. The coated substrate of claim 1 wherein the film is between about 15 and 40 mils thick.

26. The coated substrate of claim 1 wherein the particles substantially cover the exposed surface of the film.

27. A substantially non-slip coated substrate comprising:

a solid film comprising a polysulfide, the film being spread on the substrate to form an exposed film surface, and the film being between about 5 and 50 mils thick; and a layer of elastomer particles partially bound in the exposed surface of the film, at least some of the particles projecting from the top surface of the film and not being coated with film, the particles being softer than the solid film, and the particles having an average diameter of between about 0.3 and 3.0 mm.

28. The coated substrate of claim 27 wherein the particles have a specific gravity between about 1.3 and 1.8 at 20° C.

* * * * *

UNITED STATES PATENT AND TRADEMARK OFFICE
CERTIFICATE OF CORRECTION

PATENT NO. : 5,494,729
DATED : Feb. 27, 1996
INVENTOR(S) : Henry, et al.

It is certified that error appears in the above-indentified patent and that said Letters Patent is hereby corrected as shown below:

On title page, item [22]

Please delete "May 20, 1993" and substitute therefor
--May 20, 1992--.

In the Claims:

Claim 2, col. 11, line 16, please insert --is-- after "substrate" and before "non-abrasive".

Claim 12, col. 11, line 38, please delete "coating" and substitute therefor --coated substrate--.

Claim 20, col. 12, line 15, please delete "substantial" before "degradation".

Claim 23, col. 12, lines 24 and 26, please delete "coating" and substitute therefor --coated substrate--.

Signed and Sealed this

Twenty-fifth Day of June, 1996

Attest:

BRUCE LEHMAN

*Attesting Officer*     *Commissioner of Patents and Trademarks*